No. 760,312. PATENTED MAY 17, 1904.
A. H. COWLES.
PROCESS OF MAKING CALCIUM CARBID.
APPLICATION FILED JUNE 28, 1902.
NO MODEL.
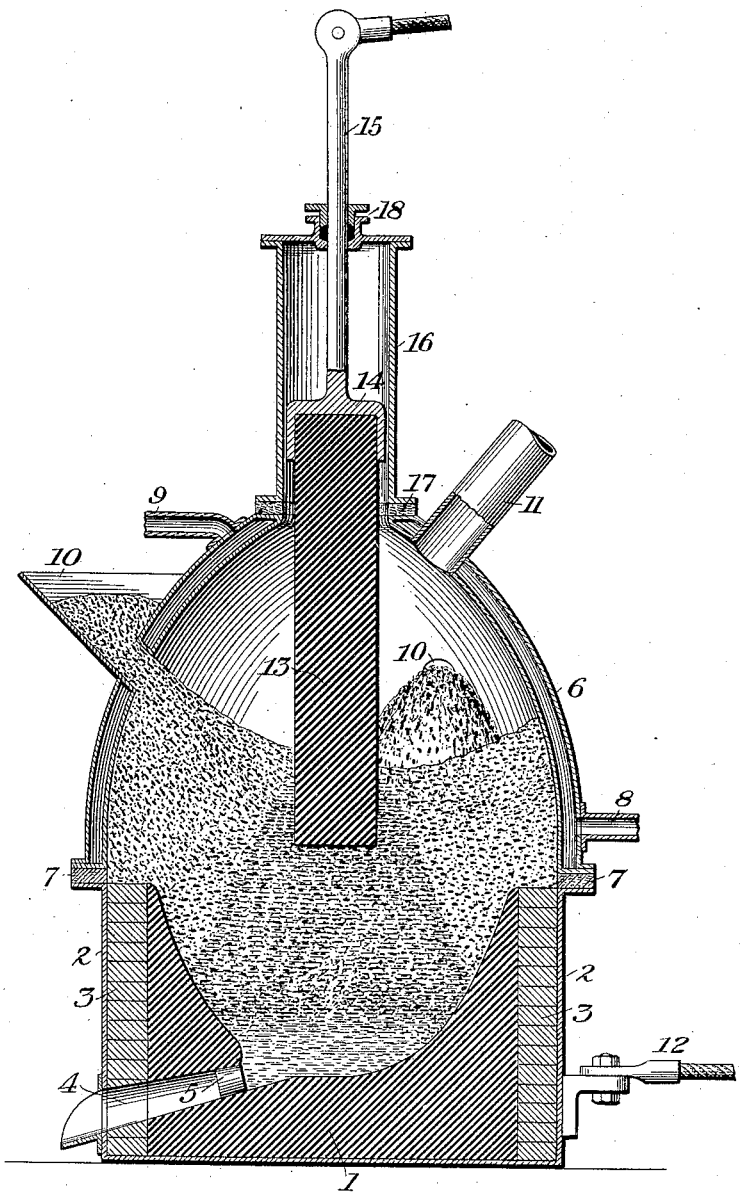
Witnesses:
R A Balderson.
W. E. Neff
Inventor:
Alfred H. Cowles,
by Byrnes & Townsend,
Attorneys.

No. 760,312. Patented May 17, 1904.

UNITED STATES PATENT OFFICE.

ALFRED H. COWLES, OF CLEVELAND, OHIO.

PROCESS OF MAKING CALCIUM CARBID.

SPECIFICATION forming part of Letters Patent No. 760,312, dated May 17, 1904.

Application filed June 28, 1902. Serial No. 113,639. (No specimens.)

*To all whom it may concern:*

Be it known that I, ALFRED H. COWLES, a citizen of the United States, residing at Cleveland, in the county of Cuyahoga and State of Ohio, have invented certain new and useful Improvements in Processes of Making Calcium Carbid, of which the following is a specification.

This process is intended for the continuous production of calcium carbid and involves the use as a means for heating the charge of raw materials of a resistance-conductor which is raised to a high temperature by the passage of an electric current through it. The process further involves the use of a sufficient temperature to melt the carbid or maintain it in a molten condition and the removal of the carbid from the furnace through a tap-hole or other suitable outlet, fresh materials being supplied as required to replace those converted into carbid. The resistance-conductor may be a carbon rod or core having suitable terminal connections to the source of electric current. The mixture of lime and carbon is then packed around the core and raised to the necessary temperature by the heat radiated from the incandescent core. It is desirable, however, to use as the resistance-conductor the mixture of lime and carbon which constitutes the furnace charge. The charge in this case may be one containing large pieces of carbon which lie in contact with each other at various points, and thereby afford direct paths for the flow of current, the lime being distributed in the interstices between the pieces of coke. If the normal charge, however, consists of a not sufficiently conducting mixture of coke and lime, the furnace may first be put into operation by use of a conducting-core or by otherwise providing initial paths for the flow of current. The current passing in the first instance soon raises the temperature of that portion of the mixture between the electrodes to a point which will enable it to act as a resistance-conductor. In normal working condition the body of material between the electrodes may consist partly of incandescent but unreduced material and partly of molten or semimolten carbid. The temperature maintained in the furnace is preferably sufficient to cause a pool of the molten carbid to collect adjacent to the tap-hole, the carbid being tapped out either intermittently or continuously, as desired, according to the output of the furnace.

The process may be carried out in a furnace or container of any desired shape. A furnace is not even requisite, as the resistance-conductor, material undergoing reduction, and molten carbid may be held in a cavity made within a pile of the mixture of lime and coke constituting the charge. For the sake of illustration, however, one form of furnace is shown in the accompanying drawing, in which the figure is a vertical central section. The furnace shown comprises a solid carbon hearth 1, surrounded by a sheet-iron casing 2, a layer of firebrick 3 being interposed between the sides of the hearth and the casing. A tap-hole 4, having plug 5, serves to deliver the molten product from the lower portion of the hearth. A dome-shaped water-jacketed top 6 is supported upon the casing 2, being insulated therefrom by a ring 7, of asbestos. This top has double walls, preferably of sheet-iron, and water inlet and outlet pipes 8 9, leading to the space between the walls. Feeding-hoppers 10, here shown as three in number, are arranged to discharge raw material through the top into the furnace. A pipe 11 serves to deliver waste gases from the furnace. The carbon hearth serves as one of the electrodes of the furnace, current being supplied to it through the bottom of the casing 2 and a terminal 12, bolted to the casing. The other electrode 13 is made of carbon, suspended vertically within the furnace by a metal terminal 14, having an upwardly-extending stem 15. A sheet-metal casing 16 is supported on the top of the furnace, being insulated therefrom by an asbestos ring 17. The stem 15 of the upper electrode passes adjustably through a stuffing-box 18 at the upper end of this casing. The electrodes are connected to a suitable source of current, preferably an alternating one.

In operation the charge of lime and coke is fed in through the hoppers until it fills the furnace to a height somewhat above the lower end of the upper electrode. That portion of the charge between the electrodes is then brought to incandescence in any well-known manner and maintained at a temperature sufficient to effect conversion of the charge into carbid. Molten carbid accumulates on the hearth and is removed through the tap-hole, and further portions of the charge are fed in through the hoppers, the process thus being a continuous one. If the normal charge is a not sufficiently conducting mixture of lime and coke, it soon becomes heated as it descends into the furnace by the heat thrown off from the resistance-conductor or that portion of the charge between the electrodes and by the waste gases rising from the zone of reduction to a temperature which will enable it to act as a resistance-conductor when it descends into the paths of current flow.

While the resistance-conductor employed is preferably the charge itself or the resulting carbid, a permanent resistance-conductor, such as a carbon rod, may be inserted between the electrodes 1 and 13, as indicated by dotted lines.

The word "tapping" as used in the claims is intended to cover the removal of molten carbid through a tap-hole or by any suitable means. The term "body of superheated molten carbid" used in the claims is intended to mean a body of carbid which has not only been produced and melted by the heat from the resistance-conductor, but which has also been raised thereby to such a temperature that it will run through a suitably-located tap-hole without requiring further heat to be supplied to it to compensate for that lost by conduction and radiation. It is not practicable to tap molten calcium carbid from an electric furnace unless it is either superheated or more heat is supplied to it at the tap-hole, its temperature of fusion being so high and the heat losses during its transit to and through the tap-hole being so great that it will otherwise become viscid or solid and clog the tap-hole.

I claim—

1. The process of making calcium carbid, which consists in heating a resistance-conductor to incandescence by passing an electric current through it, subjecting carbid-forming materials placed around said conductor to the heat from said conductor and thereby producing a body of superheated molten carbid, and tapping out carbid and supplying fresh materials as required.

2. The process of making calcium carbid, which consists in heating a resistance-conductor of carbid-forming materials or carbid produced therefrom to incandescence by passing an electric current through it, subjecting carbid-forming materials placed around said conductor to the heat from said conductor and thereby producing a body of superheated molten carbid, and tapping out carbid and supplying fresh materials as required.

3. The process of making calcium carbid, which consists in heating carbid-forming materials to a temperature sufficient to produce a body of superheated molten carbid by passing an electric current through said materials, or carbid produced therefrom, acting as a resistance-conductor, and tapping out carbid and supplying fresh materials as required.

4. The process of making calcium carbid, which consists in maintaining a resistance-conductor of carbid in a superheated molten condition by passing an electric current through it, subjecting carbid-forming materials placed around said conductor to the heat from said conductor and thereby producing further amounts of superheated molten carbid, and tapping out carbid and supplying fresh materials as required.

5. The process of making calcium carbid, which consists in heating a vertical resistance-conductor to incandescence by passing an electric current through it, subjecting carbid-forming materials placed around said conductor to the heat from said conductor and thereby producing a body of superheated molten carbid, and tapping out carbid and supplying fresh materials as required.

6. The process of making calcium carbid, which consists in heating a vertical resistance-conductor of carbid-forming materials or carbid produced therefrom to incandescence by passing an electric current through it, subjecting carbid-forming materials placed around said conductor to the heat from said conductor and thereby producing a body of superheated molten carbid, and tapping out carbid and supplying fresh materials as required.

In testimony whereof I affix my signature in presence of two witnesses.

ALFRED H. COWLES.

Witnesses:
A. E. ROBINSON,
HORACE W. POWERS.